United States Patent [19]

Jabbari

[11] Patent Number: 5,130,870
[45] Date of Patent: Jul. 14, 1992

[54] INFORMATION STORAGE DISC BALANCE WEIGHT

[75] Inventor: Iraj Jabbari, San Jose, Calif.

[73] Assignee: Seagate Technology, Inc., Scotts Valley, Calif.

[21] Appl. No.: 632,300

[22] Filed: Dec. 21, 1990

[51] Int. Cl.⁵ .............................. G11B 25/00
[52] U.S. Cl. .................. 360/99.08; 360/133; 360/137
[58] Field of Search ............ 360/137, 99.08, 133, 360/98.07, 99.04, 99.12

[56] References Cited

U.S. PATENT DOCUMENTS

| | | | |
|---|---|---|---|
| 1,233,485 | 7/1917 | LeBlanc | 74/573 R |
| 1,805,149 | 12/1928 | Nelson | 373/456 |
| 3,633,186 | 1/1972 | Lynott et al. | 360/107 X |
| 3,838,464 | 9/1974 | Doyle | 360/137 |
| 3,905,648 | 9/1975 | Skidmore | 301/58 |
| 3,939,020 | 2/1976 | Caramanian et al. | 156/64 |
| 4,083,735 | 4/1978 | Caramanian | 156/64 |
| 4,495,812 | 1/1985 | Gorris | 73/468 |
| 4,560,893 | 12/1985 | van de Griend | 310/43 |
| 4,622,661 | 1/1986 | Hoogeuren et al. | 369/280 |

*Primary Examiner*—John H. Wolff

[57] ABSTRACT

A weight for balancing a plurality of information storage discs on a disc drive motor spindle hub. The weight is comprised of commerically available epoxy adhesive and filler material each of known density. A disc clamp which holds the information storage disc on the spindle provides a surface to which the filler material is secured through direct contact with the epoxy adhesive.

3 Claims, 3 Drawing Sheets

INFORMATION STORAGE DISC BALANCE WEIGHT

FIELD OF INVENTION

The present invention is directed generally to the field of hard disc drives, and more particularly to miniature Winchester-type hard disc drive systems.

BACKGROUND OF INVENTION

Disc drive machines record and reproduce information stored on a recording media. With the rapidly expanding development of personal computers into the field of first what were termed portable, then lap-top, and now notebook size computers, there has been a tremendous demand for maintaining the performance of the disc drive systems of such computers. The major development in this direction has been the development of smaller Winchester-type disc drives as replacements and enhancements to floppy disc drives for program storage. The Winchester disc drive, in general, provides higher capacities and faster speeds of operation, factors which are of great importance of the effective use of personal computers running advanced software packages.

Conventional Winchester-type disc drives include a plurality of vertically-aligned, rotating information storage discs, each having at least one associated magnetic head that is adapted to transfer information between the disc and an external computer system. The information storage discs are journaled about a spindle motor assembly capable of rotating the discs at high speeds. The heads are carried by a plurality of vertically-aligned, elongated flexure arms that in turn are carried by a head positioner assembly. The head positioner assembly is adapted to move the heads back and forth in unison across the face of the vertically-aligned discs. The head positioner assembly is traditionally either rotationally mounted, or take the form of a carriage that is free to move back and forth along a single axis. In either case, the head positioner assembly is adapted to precisely position the heads relative to the magnetic information storage discs.

The spindle motor assembly includes a rotatable spindle hub that is carried by a fixed spindle shaft securely mounted to the housing. A plurality of information storage discs are journaled about the spindle hub. Spacer discs are provided between adjacent information storage discs. The vertically aligned information storage discs are clamped to the spindle hub by a disc clamp secured by a plurality of screws.

The disc clamp is fabricated as a single piece of material and provides, on its surface opposed to the information storage disc, an ideal site for applying balancing weights. The prior art teaches that balancing weights are secured to the disc clamp by means of a strip of tape with adhesive qualities on opposite sides. Operational and passive vibration and shock absorption requirements are currently constrained by the ability of the adhesive tape strip to secure the individual balancing weights. Additionally, the height characteristics of the balancing weights could pose height clearance limitations.

Although only one embodiment of the present invention has been described in detail herein, it should be understood that the present invention may be embodied in many other specific forms without departing from the spirit or scope of the invention. Particularly, it should be appreciated that a wide variety of materials, each having unique and distinctive characteristics, may be used to form the information storage disc balance weight. Additionally, although the invention has been described in conjunction with its application to a particular Winchester-type disc drive, it should be appreciated that the disc balance weight design described may be applicable to a wide variety of information storage devices having widely varying designs of their components. Therefore, the present examples and embodiments are to be considered as illustrative and not restrictive, and the invention is not to be limited to the details given herein, but may be modified within the scope of the appended claims.

SUMMARY OF THE INVENTION

It is an objective of the present invention to provide a storage disc balance weight that is suitable for adhesion to the spindle motor disc clamp and having very precise weight tolerances.

Another object of the invention is to provide a storage disc balance weight that is suitable for subsequent adjustment as to its total mass and volume.

A further objective of the present invention is to provide a storage disc balance weight that is simple to apply to the spindle motor disc clamp.

To achieve the foregoing and other objects in accordance with the preferred form of the invention, information storage disc balance weight of epoxy adhesive and filler material comprised of various high density wire is applied to the disc clamp. The epoxy adhesive is then cured by brief exposure to ultraviolet light or at room or elevated temperatures.

The preferred embodiment of the present invention specifically utilizes lead wire as the filler material and epoxy 370 available from Loctite as the epoxy adhesive for the memory storage disc balance weight. The lead wire is approximately 0.025 inches in diameter and applied in an amount of approximately 15 mg. Epoxy 370 has a density of 0.065 lb/ion$^3$ density and is applied in an amount of approximately 10 mg. to 15 mg. on a predetermined location at the outer edge of the disc clamp. The total amount of epoxy 370 and lead wire utilized is in the approximate range of 30 mg. Subsequent to application, the epoxy 370 is exposed to ultraviolet light for approximately 20 seconds for purposes of curing.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

DETAILED DESCRIPTION OF THE DRAWINGS

Figure 1:
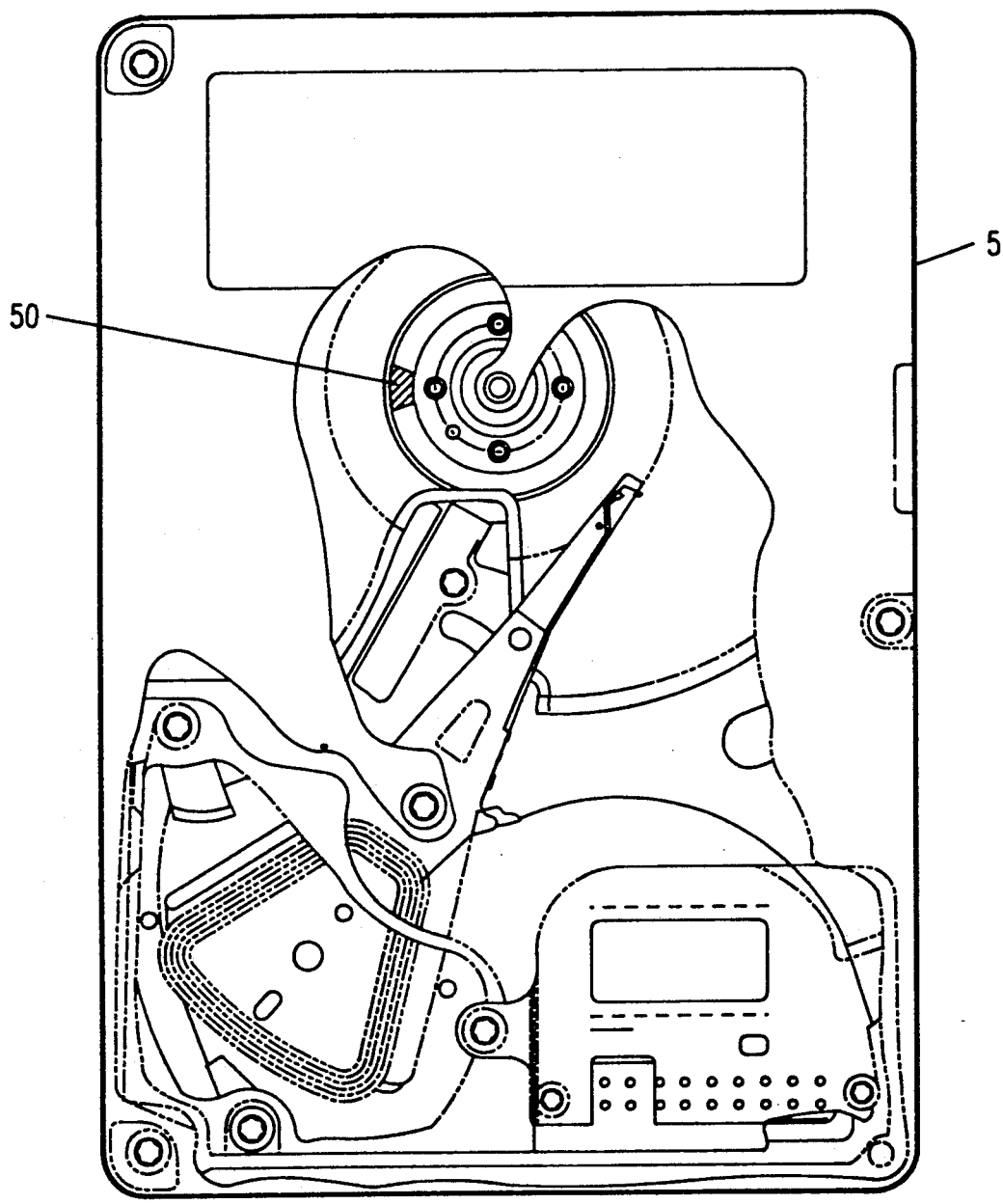
FIG. 1 is a diagrammatic top view of a disc drive with the upper casing removed that incorporates the present invention.
Figure 2:
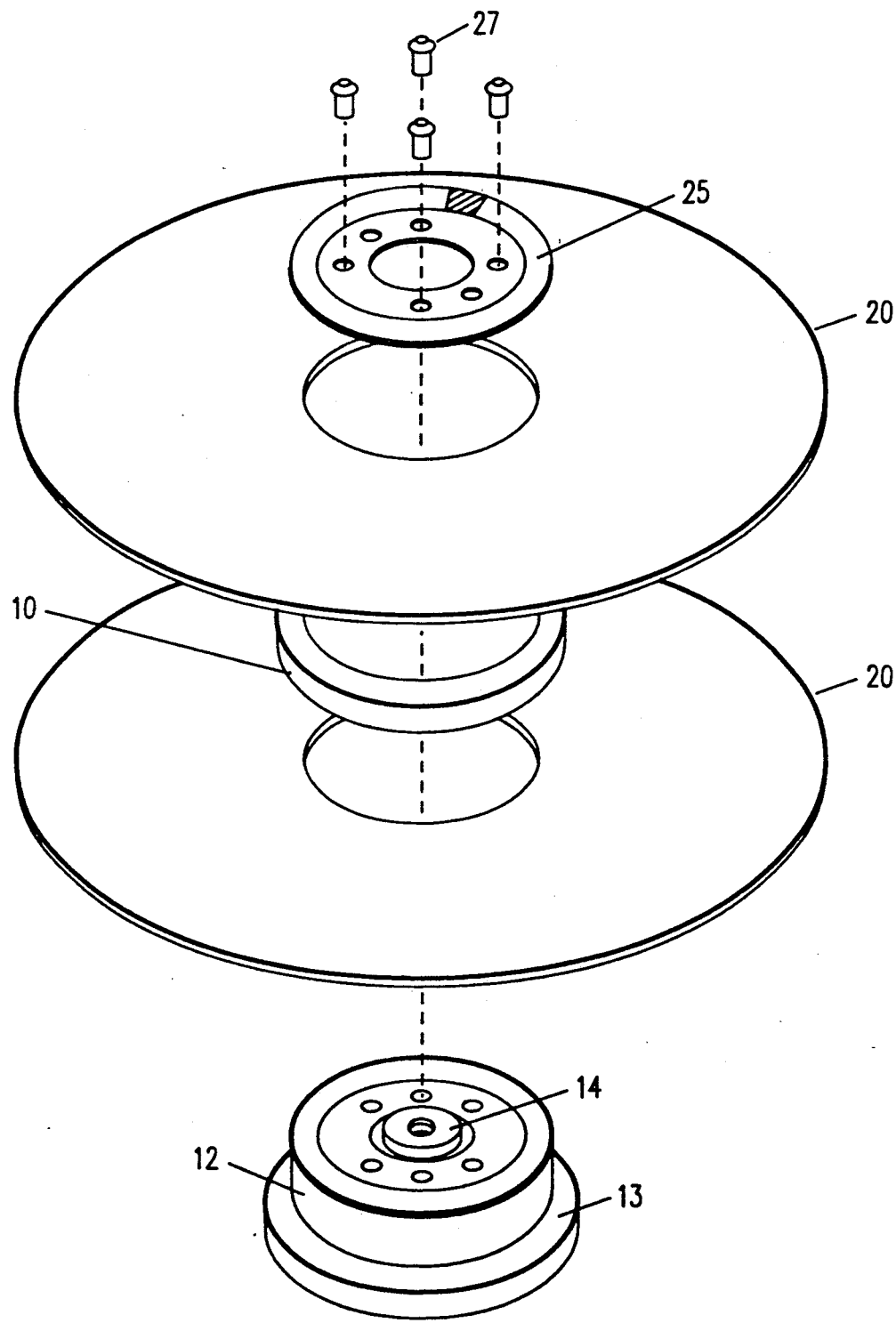
FIG. 2 is an exploded diagrammatic perspective view of the disc pack shown in FIG. 1 highlighting the mounting of the information storage discs to the spindle hub within the casing.

Referring initially to FIGS. 1 and 2, a disc drive system suitable for incorporating the teachings of the present invention is shown in diagrammatic form. A plurality of information storage discs in the form of magnetic discs may be journaled about a spindle motor assembly within a housing 5. In the embodiment of the disc drive chosen for the purpose of illustration, two information storage discs 20 are utilized and are separated by a spacer disc 10. The information storage discs 20 have a multiplicity of concentric information storage tracks for recording information.

Referring next to FIG. 2, the spindle hub 12 includes an enlarged spindle base 13 and a top portion 14. The information storage discs 20 are journaled about the spindle hub 12, separated by a spacer disc 10, and laid on top of the spindle base 13. Disc clamp 25 is placed over the top of the information storage discs 20 and is then secured to the top portion 14 of spindle hub 12 by a plurality of screws 27.

Figure 3:
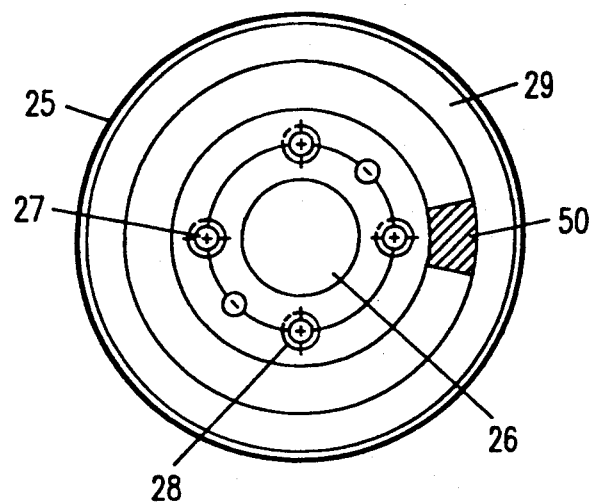
FIG. 3 is a top view of the disc clamp.
Figure 4:
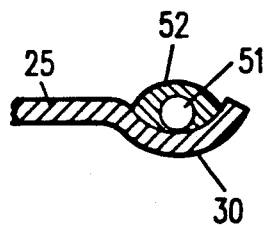
FIG. 4 is a cutaway side view of a disc clamp containing the present invention.

Referring next to FIGS. 3 and 4, the construction of disc clamp 25 will be described. The disc clamp 25 is annular and concentric about its radial axis. The disc clamp includes an annular central opening 26, and a plurality of equal spaced screw holes 28. In the embodiment shown in FIG. 3 and 4, four screw holes 28 are provided. The disc clamp has a recessed portion 29 along its peripheral edge oriented so as to provide a protruding rounded surface 30 that smoothly engages the storage disc 20 without presenting any rough edges.

FIG. 4 shows a storage disc balancing weight 50 secured at a predetermined location within and along the recessed portion 29 of the disc clamp. An individual storage disc balancing weight 50 is comprised of filler material 51 and epoxy adhesive 52. The epoxy adhesive 52 contacts and secures the filler material 51 to the disc clamp. The filler material and epoxy adhesive are of known density and provide a combined weight equivalent to an individual balance weight. The illustration is of a fine wire as filler material although alternative substances of known densities would also be adequate.

What is claimed is:

1. A weight for balancing a plurality of information storage discs comprising:
    a filler material of a known density;
    an epoxy adhesive of a known density;
    said epoxy adhesive contacting and securing said filler material along predetermined locations of said information storage discs; the density and amounts of epoxy adhesive chosen such that the epoxy adhesive forms at least 40% of the total weight of balancing weight.

2. The weight for balancing a plurality of information storage discs of claim 1 wherein the filler material is thin wire of lead composition.

3. The weight for balancing a plurality of information storage discs of claim 1 wherein the information storage discs are approximately two and one half inches in diameter and the total amount of epoxy adhesive and filler material is of an approximate weight in the range of 10 mg. to 30 mg.

* * * * *